United States Patent
Kim et al.

(10) Patent No.: US 7,489,467 B2
(45) Date of Patent: Feb. 10, 2009

(54) METHOD FOR MEASURING TRACK WIDTH OF HARD DISK DRIVE

(75) Inventors: Jae-Hyeong Kim, Yongin-si (KR); Yong-Gwon Lee, Dongan-gu (KR); Sang-Hoon Chu, Giheung-gu (KR); Cheol-Hoon Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 52 days.

(21) Appl. No.: 11/699,991

(22) Filed: Jan. 31, 2007

(65) Prior Publication Data

US 2007/0188903 A1      Aug. 16, 2007

(30) Foreign Application Priority Data

Feb. 1, 2006    (KR) .............. 10-2006-0009606

(51) Int. Cl.
  G11B 21/02    (2006.01)
  G11B 5/596    (2006.01)
(52) U.S. Cl. ................... 360/75; 360/77.08
(58) Field of Classification Search .......... None
  See application file for complete search history.

(56) References Cited

U.S. PATENT DOCUMENTS

| | | | | |
|---|---|---|---|---|
| 6,064,542 A | * | 5/2000 | Shepherd | 360/77.08 |
| 6,313,964 B1 | | 11/2001 | Lamberts et al. | |
| 2002/0039247 A1 | * | 4/2002 | Bi et al. | 360/76 |
| 2006/0109584 A1 | * | 5/2006 | Chung et al. | 360/75 |
| 2008/0002283 A1 | * | 1/2008 | Chase et al. | 360/77.08 |

FOREIGN PATENT DOCUMENTS

JP    2003-331545    11/2003

* cited by examiner

*Primary Examiner*—Andrew L. Sniezek
(74) *Attorney, Agent, or Firm*—Volentine & Whitt, PLLC

(57) ABSTRACT

In a method of measuring track widths in a hard disk drive a plurality of estimation values are calculated based on differences in intensity between a plurality first measurement signals produced in relation to a head of the hard disk drive based on a plurality of burst signals stored in servo sectors of a track when the head moves along the track on a first side of a center of the track, and a plurality of second measurement signals produced in relation to the head of the hard disk drive based on the plurality of burst signals when the head moves along the track on a second side of the center of the track opposite the first side. The estimation values are then normalized, and excessive variation in the track widths is detected based on the normalized estimation values.

13 Claims, 13 Drawing Sheets

METHOD FOR MEASURING TRACK WIDTH OF HARD DISK DRIVE

BACKGROUND OF THE INVENTION

1. Field of the Invention

Embodiments of the invention relate generally to hard disk drives. More particularly, embodiments of the invention relate to methods of measuring track width variation in hard disk drives, and recording media adapted to store computer programs used by the methods.

A claim of priority is made to Korean Patent Application No. 10-2006-0009606, filed on Feb. 1, 2006, the disclosure of which is hereby incorporated by reference in its entirety.

2. Description of Related Art

Hard disk drives (HDDs) are commonly used to provide data storage for computer systems. Hard disk drives are characterized by providing vast amounts of data storage and efficient access to stored data. In general, hard disk drives are formed by a combination of electronic and mechanical parts used to record data on a magnetic storage medium by converting digital signals into magnetic fields in order to magnetize portions of the magnetic storage medium. The electronic and mechanical parts are also used to reproduce data stored on the magnetic storage medium by converting magnetic fields produced by magnetized portions of the magnetic storage medium into digital signals.

In most hard disk drives, data is stored in concentric circular tracks on the magnetic storage medium. Accordingly, in order to accurately read and record data on these tracks, a read/write head of the hard disk drive must be properly positioned with respect to the tracks. In modern "embedded servo" hard disk drives, this positioning is accomplished by programming "servo data," or "servo patterns" at various angular positions of each concentric track using a servo writer and then using the servo data to sense the head's position as it moves along the tracks. The servo data allows the HDD to sense the head's position because the servo data produces different output signals in the head depending on the head's position in relation to the center of each track. The servo data is typically programmed on the HDD when the HDD is manufactured and then remains the same throughout the life of the HDD. Accordingly, it is important that the servo data is accurately placed at the time of a hard disk drive's manufacture.

One problem that can occur in the manufacture of hard disk drives is that imprecise programming of the servo data can cause the tracks to have undesirable width variation, both within each track and between tracks. In order to form each track with a consistent width, the servo writer must program the servo data with a high degree of precision. If the servo writer is not precisely positioned when the servo data is programmed on a HDD, the tracks of the HDD will have different, non-uniform widths. Where this happens, the head may not be able to achieve accurate positioning for reading and writing data on the HDD.

For example, FIG. 1 is a graph illustrating the positioning of data written on a HDD. Referring to FIG. 1, portions of three different tracks are illustrated by a rectangular grid. In each grid, white blocks indicate portions of the track that have been written. As can be seen in the grids, upper portions of each track are written and lower portions of each track are not written. In other words, the data on of these tracks is written slightly off the center of each track. One reason for this off-center writing of these tracks is that the tracks do not have constant widths, as defined by the servo data.

There are a variety of methods for recording servo data in hard disk drives. However, it is difficult to form ideal servo patterns due to inherent limits of conventional servo writer technology. Accordingly, to address the problems inherent in the servo writer technology, track width variation is typically monitored when the servo writer writes the servo data by explicitly measuring track width variation. In other words, after the servo writer writes the servo data, an additional step is performed to detect the width of resulting data tracks. In addition, further steps may also be performed to verify the quality of servo patterns themselves.

In a conventional method for measuring a track width, a head is moved to a predetermined distance from a 0% off track. The term "off track" here refers to a relative displacement of the head from a track's center. A percentage of off track is measured in a minus (−) direction on one side of the track center, and a plus (+) direction on an opposite side of the track center. Once the head is moved to the predetermined distance from the 0% off track, the head measures the track width in relation to "servo bursts", or burst signals, which form part of the servo data.

The above method uses two different limits to evaluate the severeness of track width variation. The first limit relates to an overall width difference between a track and neighboring tracks. The second limit relates to variation of the widths of sides of each track with respect to the center of the track.

As an example, FIG. 2 is a graph illustrating measurements of a track's width taken using a conventional method. In FIG. 2, there are two curves corresponding to the amplitudes of signals produced in the head of a hard disk drive in relation to burst signals when the head is moved along the track on opposite sides of the track's center. As seen in FIG. 2, there is significant variance within each of the measured signals, and the there is also significant variance in the distance between the signals. The variance within each signal can be interpreted as variation in the width of the track, and the variation in the distance between the signals can be interpreted as variation in the widths of neighboring tracks in the hard disk drive. However, much of the variation can also be attributed to noise in the measurement process, e.g., in the form of unknown variations in the amplitudes of burst signals used to generate the signals.

FIG. 3 is another graph illustrating measurements of a track's width taken using a conventional method. Like FIG. 2, FIG. 3 contains two curves corresponding to the amplitudes of signals produced in relation to burst signals when a head is moved along the track on opposite sides of the track's center. Like the curves in FIG. 2, the curves in FIG. 3 also exhibit significant variation, indicating possible variation in track width. However, the curves in FIG. 3 have a more clear separation than the curves in FIG. 2, potentially indicating the width of the curves and the widths of neighboring curves.

In conventional methods for measuring track widths in a hard disk drive, track width variation between neighboring tracks is measured under an assumption that each servo burst among the servo data in the tracks has substantially the same electromagnetic properties, e.g., the same amplitude. In addition, the track width variation is also measured under an assumption that a center point of each track and therefore deviation of written data from the center point, can be identified with some degree of accuracy.

Unfortunately, however, the amplitude of the servo bursts can vary, making the measurements of the track widths and the track center points somewhat unreliable. Accordingly, the range of allowable measured track width variation must be adjusted to account for the uncertainty in the amplitudes of the servo bursts. Moreover, the allowable measured track width variation must also be adjusted when measuring the track widths of hard disk drives having different burst signal amplitudes or different number of tracks per inch (TPI) due to differences in the accuracy of corresponding servo writers.

SUMMARY OF THE INVENTION

According to one embodiment of the invention, a method of measuring track widths in a hard disk drive comprises calculating a plurality of estimation values based on differences in intensity between a plurality first measurement signals produced in relation to a head of the hard disk drive based on a plurality of burst signals stored in servo sectors of a track when the head moves along the track on a first side of a center of the track, and a plurality of second measurement signals produced in relation to the head of the hard disk drive based on the plurality of burst signals when the head moves along the track on a second side of the center of the track opposite the first side. The method further comprises normalizing the estimation values, and detecting excessive variation in the track widths of the hard disk drive based on the normalized estimation values.

According to another embodiment of the invention, a data storage medium stores a computer program for performing a method. The method comprises calculating a plurality of estimation values based on differences in intensity between a plurality first measurement signals produced in relation to a head of the hard disk drive based on a plurality of burst signals stored in servo sectors of a track when the head moves along the track on a first side of a center of the track, and a plurality of second measurement signals produced in relation to the head of the hard disk drive based on the plurality of burst signals when the head moves along the track on a second side of the center of the track opposite the first side. The method further comprises normalizing the predetermined estimation values and detecting excessive variation in the track widths of the hard disk drive based on the normalized estimation values.

According to still another an embodiment of the invention, a hard disk drive comprises a storage medium comprising tracks adapted to record and store information, a head adapted to read data from the disk, and a controller. The controller is adapted to calculate a plurality of estimation values based on differences in intensity between a plurality first measurement signals produced in relation to the head based on a plurality of burst signals stored in servo sectors of a track of the storage medium when the head moves along the track on a first side of a center of the track, and a plurality of second measurement signals produced in relation to the head of the hard disk drive based on the plurality of burst signals when the head moves along the track on a second side of the center of the track opposite the first side. The controller is further adapted to normalize the predetermined estimation values and detects excessive variation in the track widths of the hard disk drive based on the normalized estimation values.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

Figure 1:
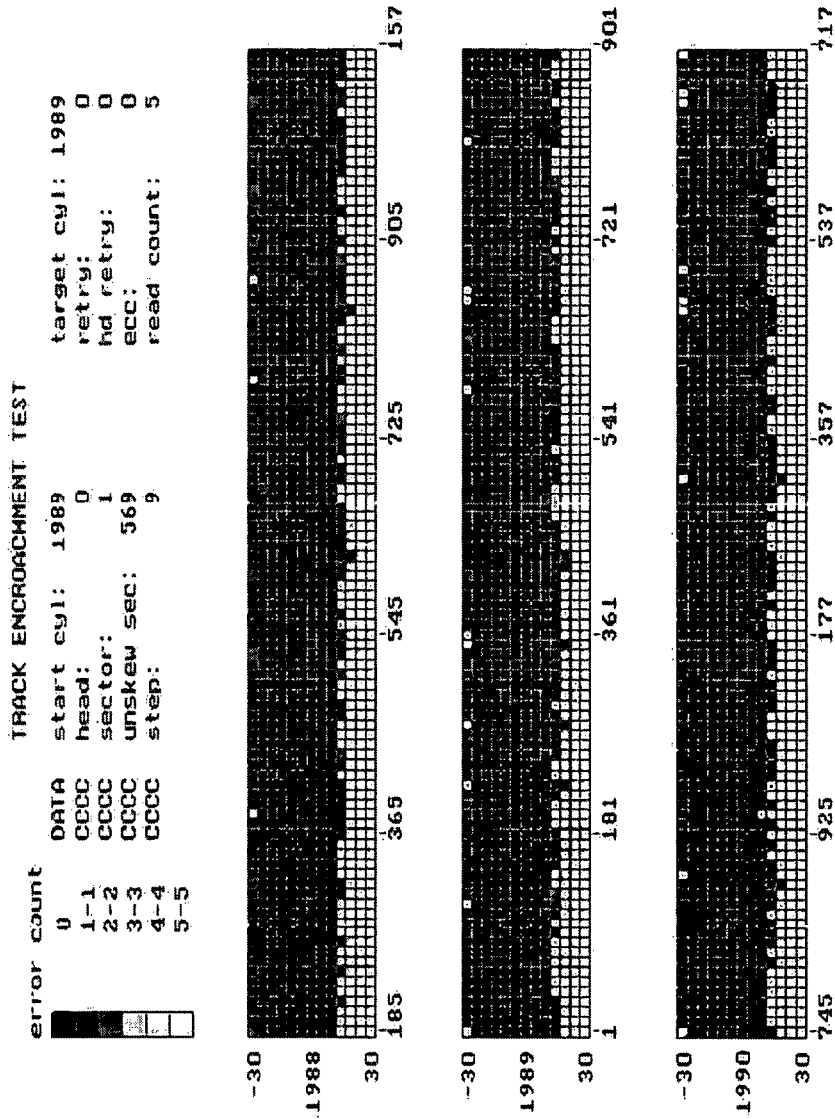
FIG. 1 is a graph illustrating the positioning of data written on a HDD.
Figure 2:
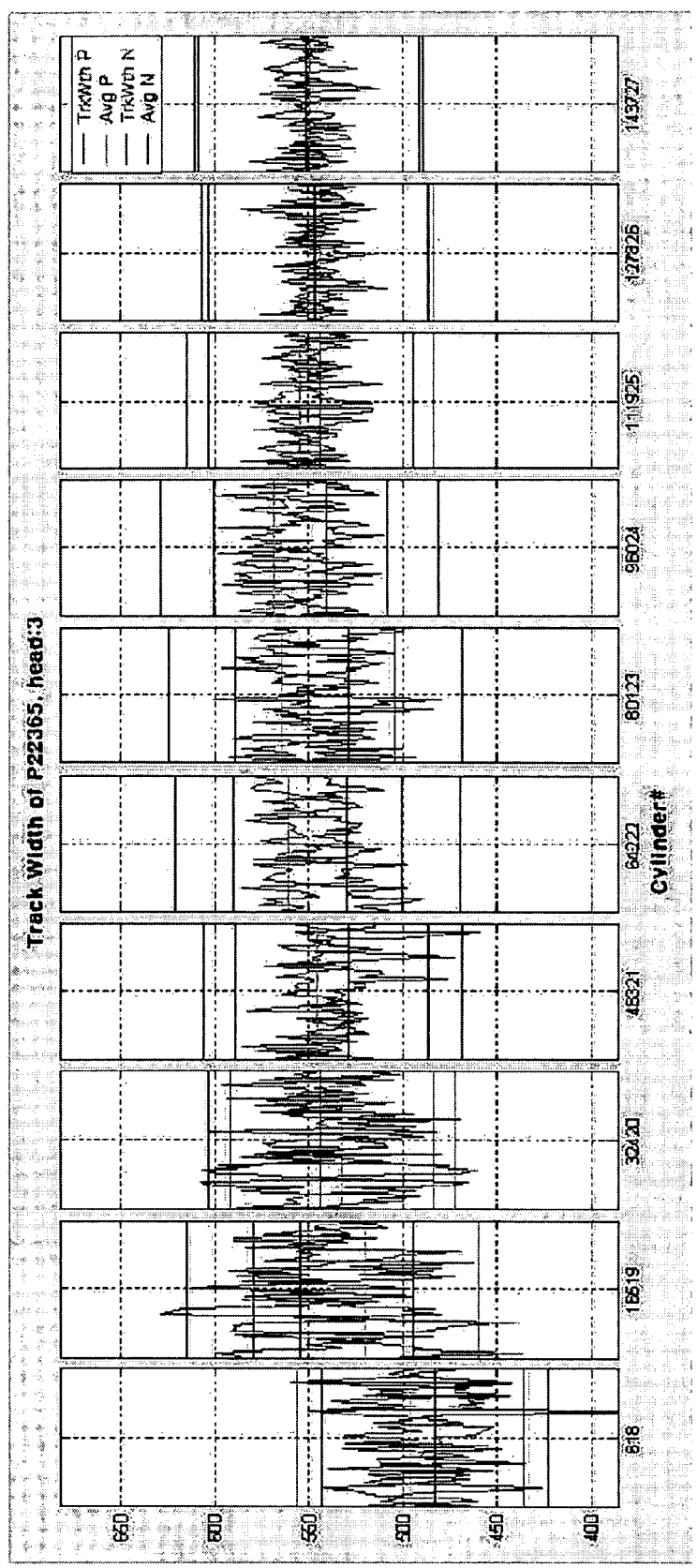
FIG. 2 is a graph illustrating an example of track width variation in a hard disk drive as measured by a conventional method.
Figure 3:
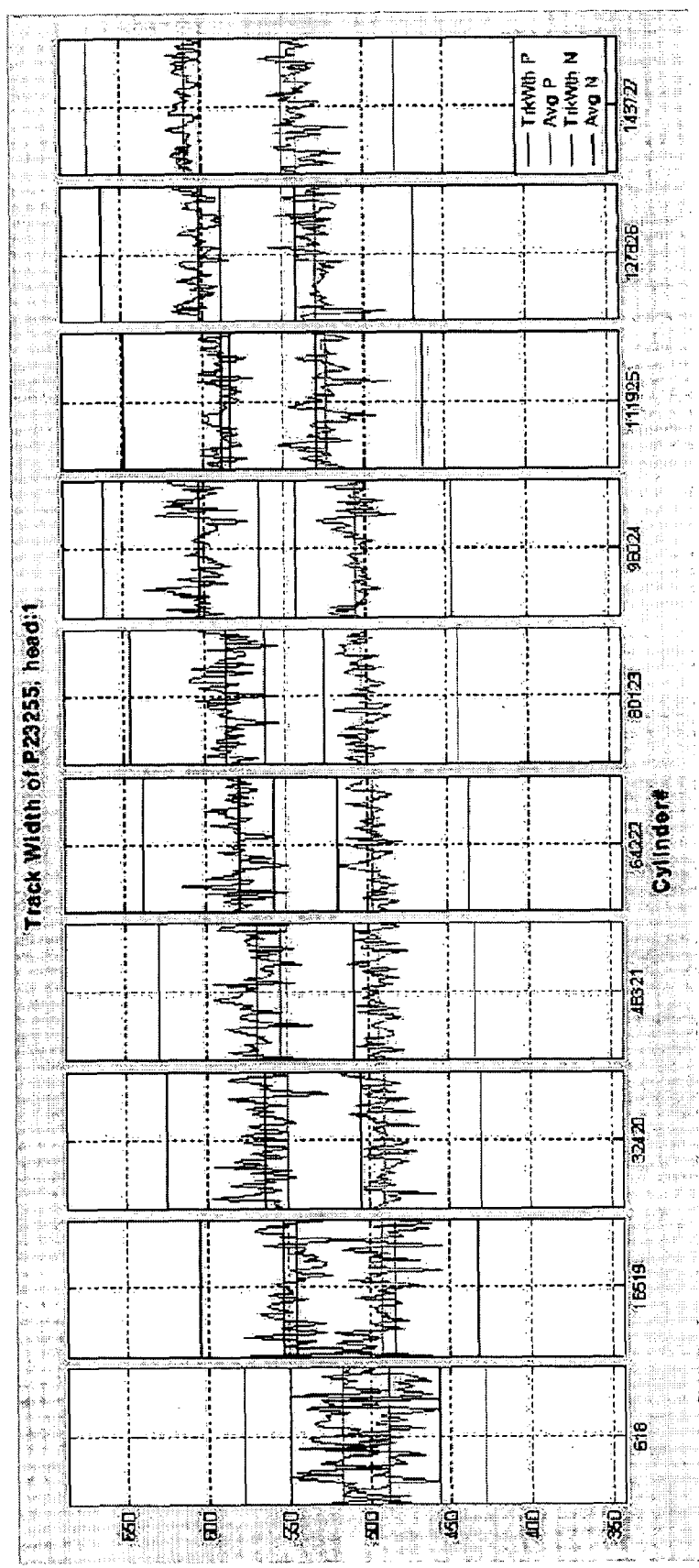
FIG. 3 is another graph illustrating an example of track width variation in a hard disk drive as measured by a conventional method.
Figure 4:
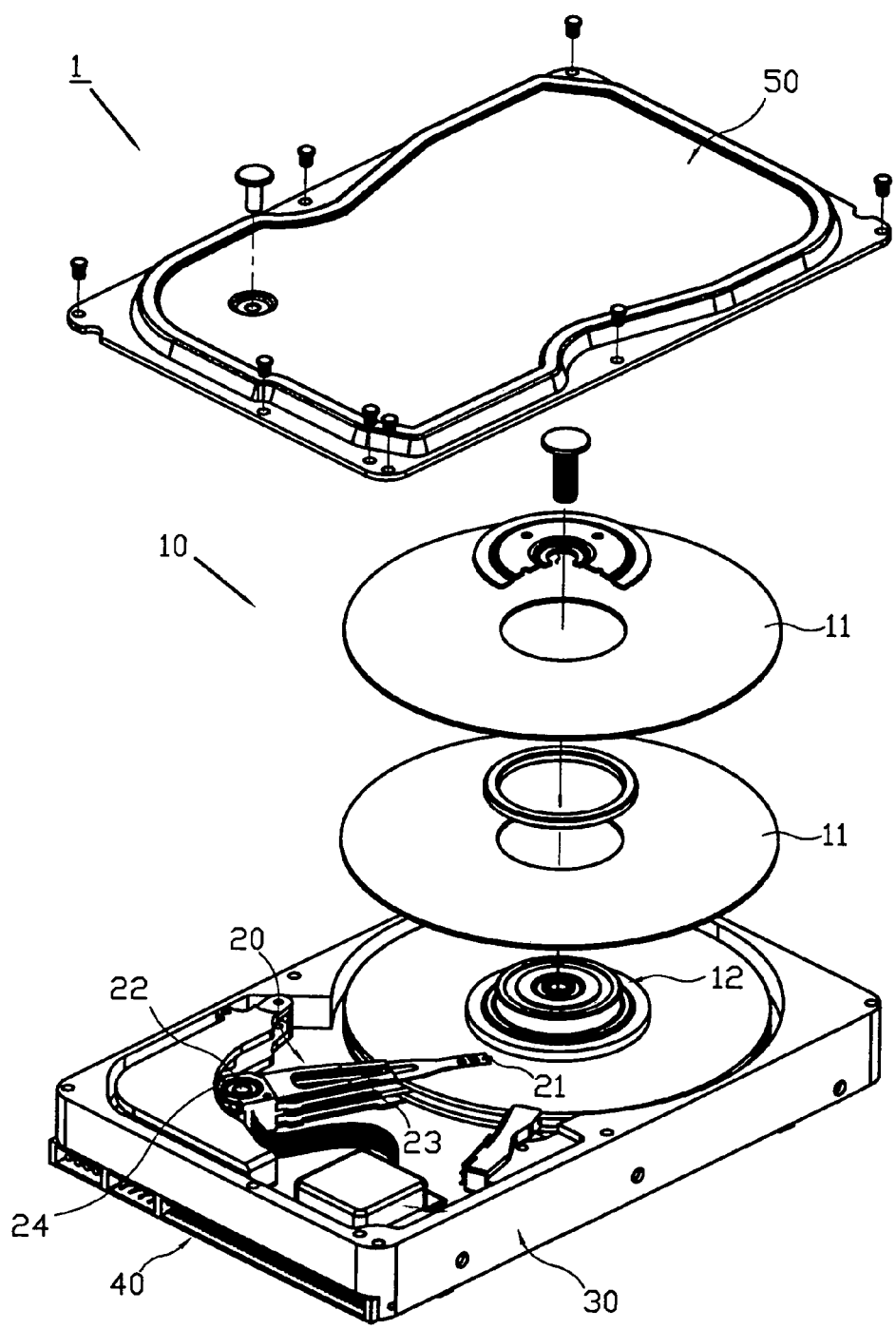
FIG. 4 is a partially exploded view of a hard disk drive according to an embodiment of the present invention.

FIG. 4 is a partially exploded perspective view of a hard disk drive (HDD) 1 according to one embodiment of the present invention. Referring to FIG. 4, HDD 1 comprises a disk pack 10 including a disk 11 for recording and storing data and a spindle motor 12 for supporting and rotating disk 11, a head stack assembly (HSA) 20 for reading the data stored on disk 11, a base 30 to which these parts are assembled, a printed circuit board assembly (PCBA) 40 coupled to a lower portion of base 30 and having a printed circuit board (PCB) on which circuit parts for controlling various parts of HDD 1 are installed, and a cover 50 covering an upper portion of base 30.

HSA 20 is a carriage used to record and read data on disk 11. HSA 20 includes a head 21 for recording and reading data on disk 11, an actuator arm 23 pivoting on a pivot shaft 22 above disk 11 to allow head 21 to access data on disk 11, a pivot shaft holder 24 rotatably supporting pivot shaft 22, to which actuator arm 23 is coupled, and a bobbin (not shown) provided in a direction opposite to actuator arm 23 with respect to pivot shaft holder 24. A voice coil 25 (See, FIG. 8) is wound around the bobbin to be interposed between magnets (not shown) of a voice coil motor VCM (not shown). Head 21 reads or records information on disk 11 as disk 11 rotates by sensing a magnetic field on the surface of disk 11 or magnetizing the surface of disk 11.

The VCM is a drive motor that pivots actuator arm 23 to move head 21 to a desired position on disk 11 using Fleming's left hand rule. As current is applied to voice coil 25 (See, FIG. 8) between the magnets, a force is applied to the bobbin so that the bobbin moves. Accordingly, actuator arm 23 extending opposite the bobbin from pivot shaft holder 24 pivots so that head 21 supported at the end of actuator arm 23 moves across disk 11 as disk 11, which rotates to search and access tracks. The accessed information then undergoes signal processing such as sampling, encoding, decoding, and so on.

Figure 5:
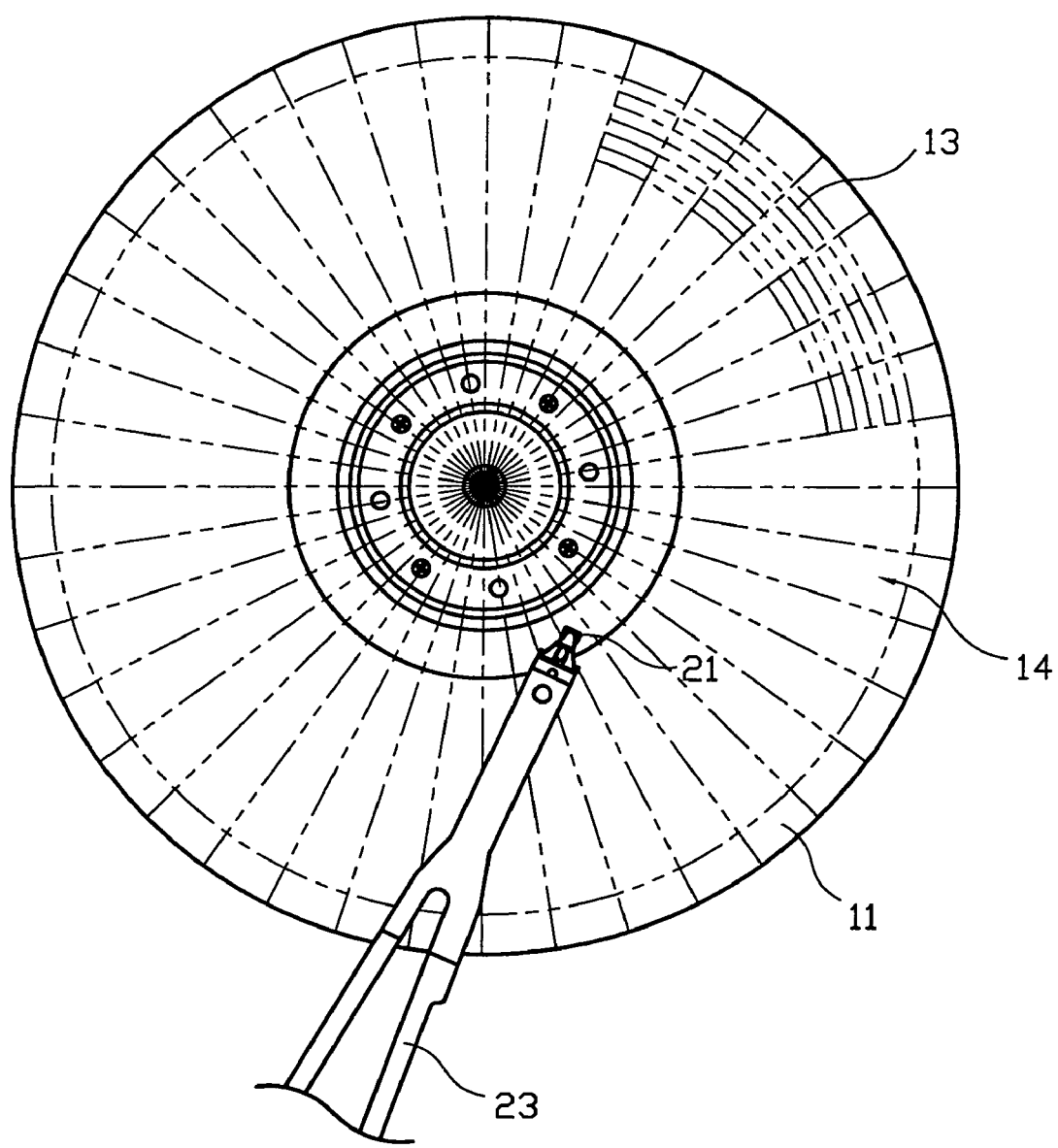
FIG. 5 is a plan view showing a disk area of the hard disk drive of FIG. 4.

FIG. 5 is a plan view of a disk area of HDD 1 shown in FIG. 4. Referring to FIG. 5, disk 11 comprises tracks 13 where servo data and user data (e.g., data used to perform some function in a computer system) are stored and sectors 14 obtained by dividing tracks 13 at substantially equal angular intervals with respect to a center of rotation of HDD 1.

Figure 6:
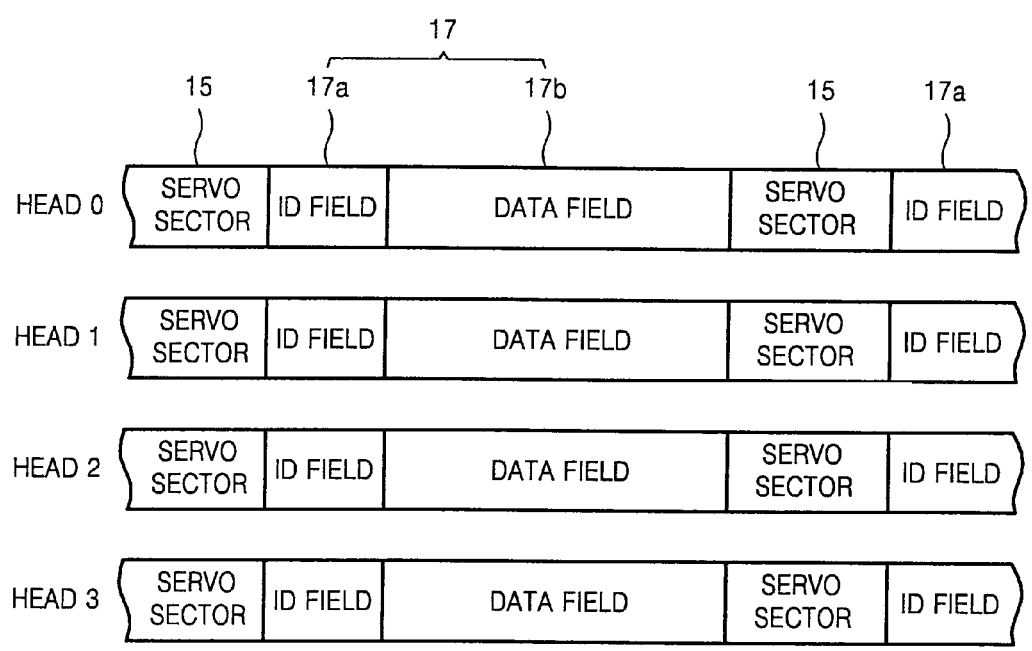
FIG. 6 is conceptual diagram illustrating a data format of each track in the hard disk drive of FIG. 4.

FIG. 6 is a conceptual diagram illustrating a format of data stored in several tracks of HDD 1. Referring to FIG. 6, track 13 comprises servo sectors 15 and data sectors 17 arranged in an alternating pattern. Servo sectors 15 are used to store servo data for servo control such as track seeking and track following and data sectors 17 are used for recording user data.

Figure 7:
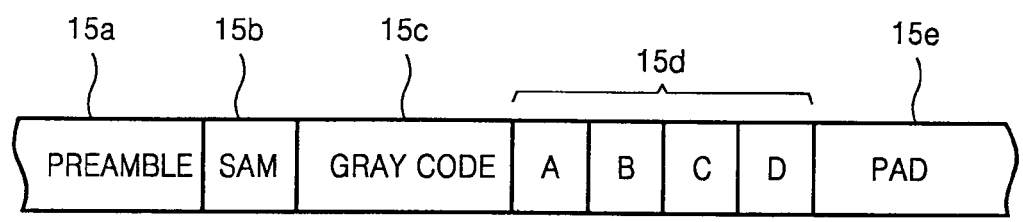
FIG. 7 is a conceptual diagram illustrating a detailed structure of a servo sector illustrated in FIG. 6.

FIG. 7 is a conceptual diagram illustrating a more detailed structure of a servo sector shown in FIG. 6. Referring to FIG. 7, each servo sector 15 comprises a preamble 15a, a servo address mark (SAM) 15b, a gray code 15c, bursts 15d (labeled A, B, C, and D), and a PAD 15e.

Preamble 15a, also referred to as a servo sync, identifies servo sector 15 and provides clock synchronization for reading servo data and a gap before servo sector 15. SAM 15b indicates a start of servo data to be read and provides synchronization information for reading gray code 15c. In other words, SAM 15b is used as a reference point for generating a variety of timing pulses related to servo control. Gray code 15c provides information about track 13. Bursts 15d provide position error signals (PES) required for track searching and track following. PAD 15e provides a transition margin between servo sector 15 and data sector 17.

Data sectors 17 are located adjacent to servo sectors 15. Each data sector 17 is divided into an ID field 17a and a data field 17b. ID field 17a contains header information used to identify a specific data sector. Data field 17b contains digital data typically defined and accessed by a user.

Figure 8:
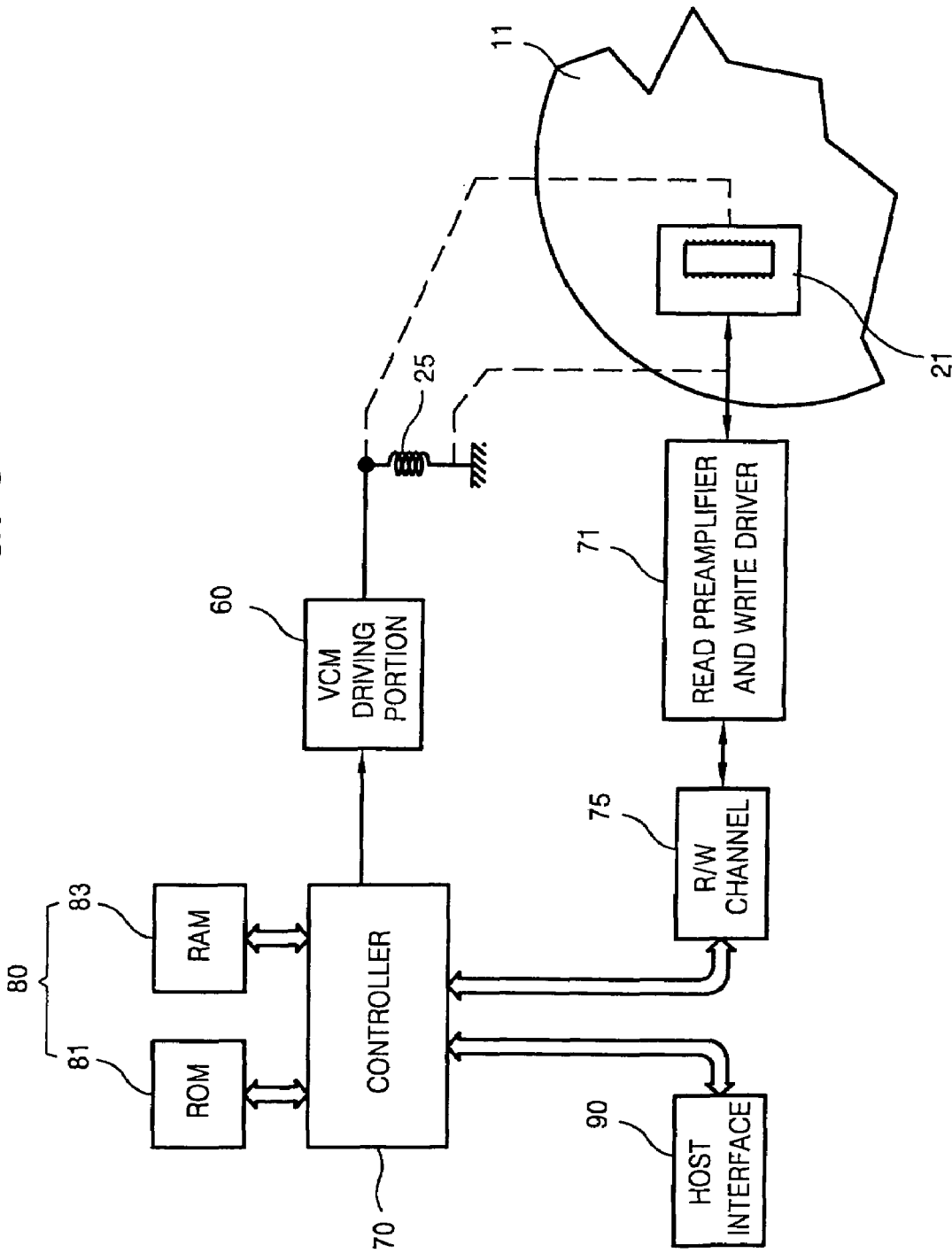
FIG. 8 is a block diagram of a driving circuit for a hard disk drive employing a track width measuring method according to an embodiment of the invention.

FIG. 8 is a block diagram of a driving circuit for a hard disk drive employing a track width measuring method according to an embodiment of the invention.

Referring to FIGS. 4 and 8, HDD 1 comprises disk 11, head 21, spindle motor 12, actuator arm 23, a VCM driving portion 60 supplying drive current to voice coil 25 to control the driving of the VCM and the motion of head 21, a read/write (R/W) channel 75, and a controller 70 connected to head 21 by a read preamplifier and write driver 71.

A memory 80 is coupled to controller 70. Memory 80 typically comprises a non-volatile memory such as a read only memory (ROM) 81 or a flash memory, and a random access memory RAM 83. Memory 80 stores commands and data used by controller 70 to execute a software routine. The software routine includes a seek routine for moving head 21 from one track 13 to another track 13. The seek routine includes a server control routine which guarantees accurate movement of head 21 with respect to track 13.

The information is typically transmitted from R/W channel 75 to a host interface 90. Host interface 90 generally comprises a control circuit for interfacing with a system such as a personal computer.

R/W channel 75 performs signal processing. For example, in a reproduction mode, R/W channel 75 converts an analog signal read by head 21 and amplified by read preamplifier and write driver 71 to a digital signal that can be read by a host computer (not shown) and outputs the converted signal to host interface 90. In a recording mode, R/W channel 75 receives user data from the host computer through host interface 90, converts the received user data to write current to write the data to disk 11, and outputs the converted write current to the read preamplifier and write driver 71.

Controller 70 typically comprises a digital signal processor (DSP), a microprocessor, and a microcontroller, and can be controlled by software or firmware. Controller 70 supplies a control signal to R/W channel 75 to read data from disk 11 or write data to disk 11. In a burn-in step, controller 70 calculates estimated values of the widths of tracks 13 my sensing amplitudes of burst signals 15d using head 21 when head 21 is moved a predetermined distance in a first direction from the center of track 13 and a second direction opposite the first direction. Differences in the sensed amplitudes of burst signals 15d are then measured to provide the estimated values of the widths of tracks 13. The estimated values are normalized and the regularity of tracks 13 is measured based on the normalization estimated values.

In other words, controller 70 determines the severeness of the track width variation based on the estimated values of tracks 13 computed from the sensed amplitudes of burst signals 15d. In making this determination, controller 70 normalizes the estimated values measured by the difference in the burst signals and determines the regularity of the track width based on the normalized estimation values. As the estimated values are normalized, the regularity of the track width can be determined by applying the same allowable limit value to all hard disk drives regardless of amplitude variation of the burst signals or variation in TPI.

Figure 9:
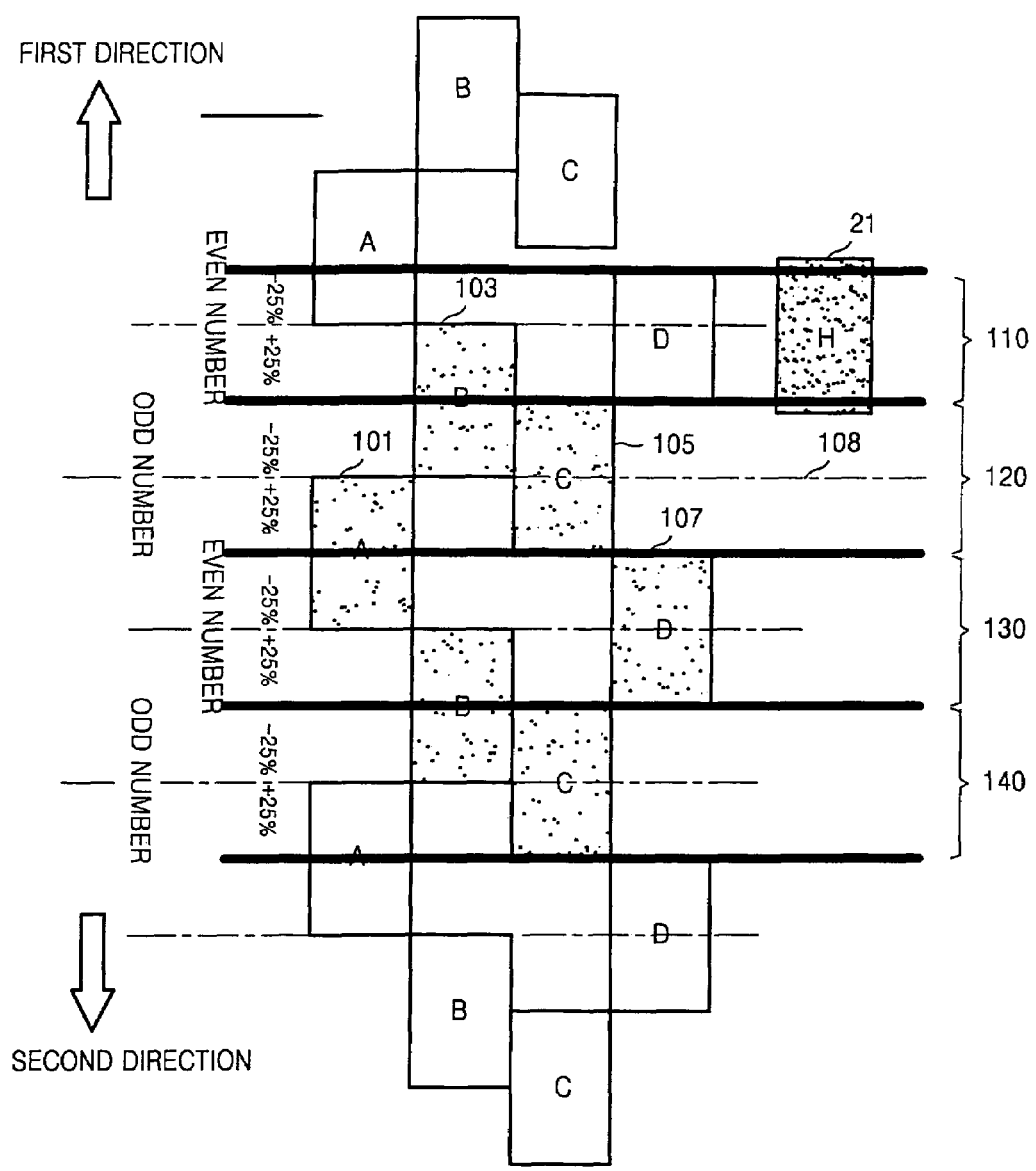
FIG. 9 is a diagram illustrating states in which servo bursts are recorded in a servo sector of the hard disk drive illustrated in FIG. 4.

FIG. 9 is a diagram illustrating states of burst signals recorded in the servo sector of a hard disk drive. Referring to FIG. 9, in a burst pattern of the servo sector, four burst signals 101, 103, 105, and 107 (labeled A, B, C, and D, respectively) are arranged with respective phase differences of 90° in a direction in which head 21 proceeds. Burst signals 101 and 103 are recorded between odd and even tracks as illustrated by boxes labeled "A" and "B" in FIG. 9. For example, burst signal 101 is recorded across an even track 110 and an odd track above even track 110. Burst signal 103 is recorded across even track 110 and an odd track 120. Similarly, burst signal 105 is recorded in odd tracks as illustrated by boxes labeled "C" in FIG. 9, and burst signal 107 is recorded in even tracks as illustrated by boxes labeled "D" in FIG. 9. For example, burst signal 105 is recorded in odd tracks 120 and 140, and burst signal 107 is recorded in even tracks 110 and 130.

When disk 11 rotates in a direction indicated by a horizontal arrow in FIG. 9, head 21 sequentially passes through burst signals 107, 105, 103, and 101 and samples electric signals corresponding to magnetic fields generated in relation to the burst signals. By comparing the sampled magnetic field strengths, the position of head 21 relative to even and odd tracks 110, 120, 130, and 140 can be evaluated. The magnitudes of the burst signals detected by head 21 are proportional to the areas of the respective burst signals that head 21 passes over. Thus, where head 21 normally follows a track, or in other words, head 21 moves along a center line 108 of the track, the magnitudes of burst signals 101 and 103 detected by head 21 are the same. On an odd track, the magnitude of burst signal 105 will be a maximum and the magnitude of burst signal 107 will be a minimum.

Where head 21 does not move along center line 108 of the track, the magnitudes of the burst signals detected by head 21 will deviate from their ideal values from when head 21 normally follows the track. Typically, predetermined estimation values based on differences in the burst signals from their ideal values detected as the head 21 passes through a position that is ±25% from the center of the track are calculated according to a predetermine rule and the estimation values are normalized. The regularity of the track width can then be determined based on the normalized estimation values.

Figure 10A:
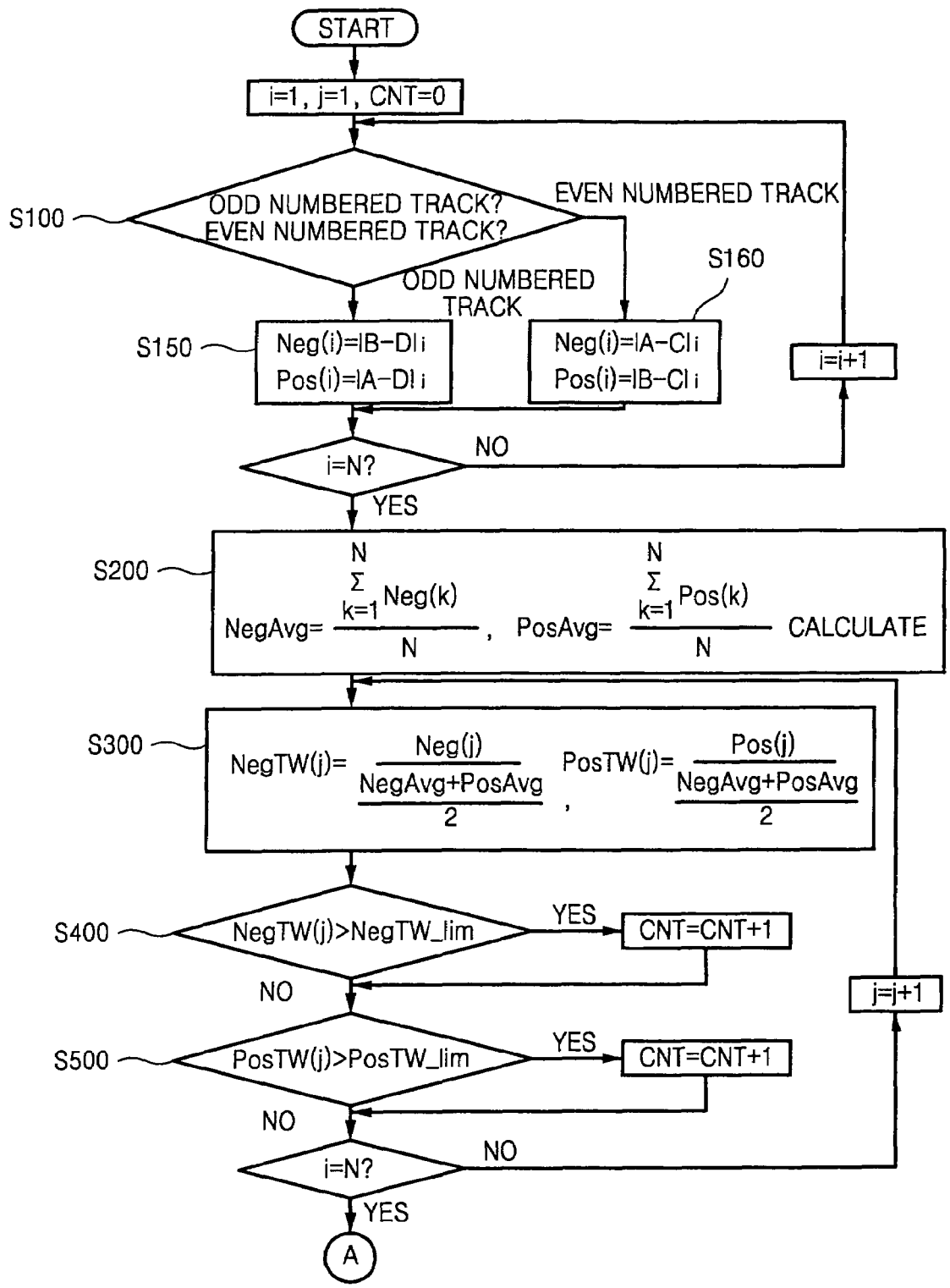
FIGS. 10A and 10B are flowcharts illustrating a method of measuring a track width of a hard disk drive according to an embodiment of the invention.
Figure 10B:
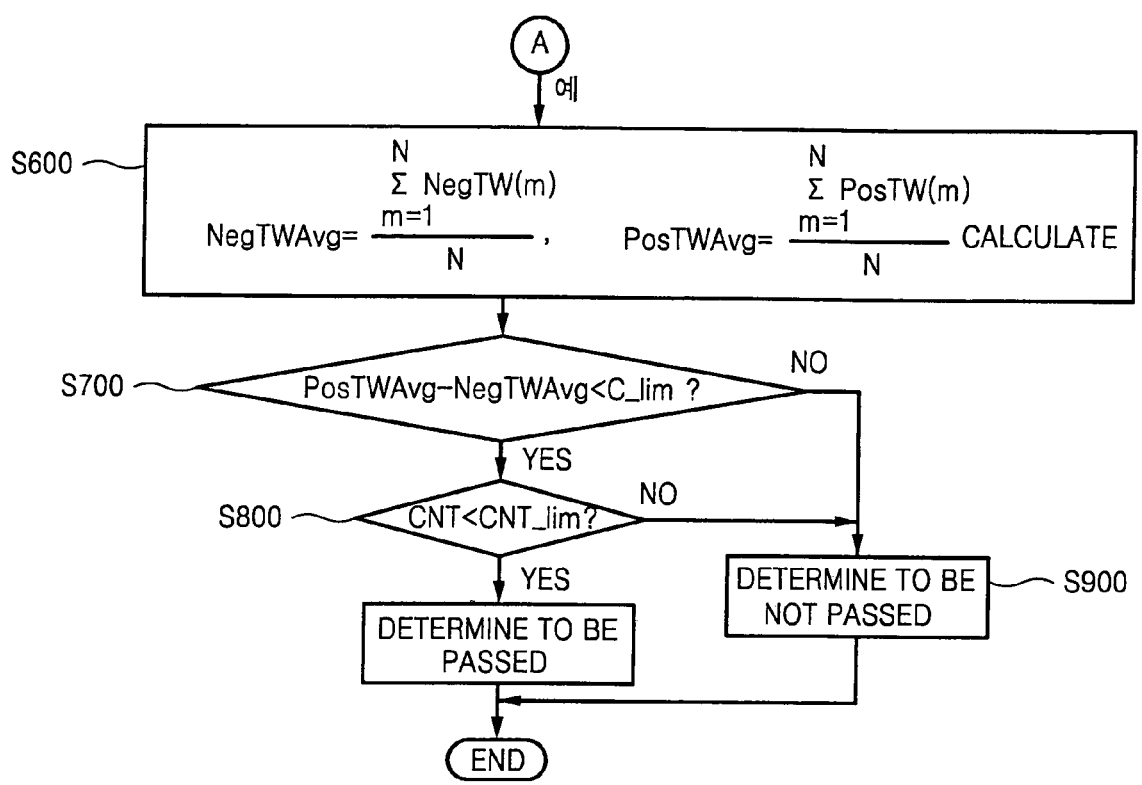

FIGS. 10A and 10B are flowcharts illustrating a method of measuring a track width in hard disk drive according to an embodiment of the invention. In the description relating to FIGS. 10A and 10B, exemplary method steps are denoted by parenthesis (XXX) to distinguish them from other types of features illustrated in the drawings.

Referring to FIG. 10A, the method first determines whether a track whose width is being measured is an odd numbered track or an even numbered track (S100). Where the track is an odd numbered track, a first value "Neg" is computed as an absolute value of a difference between a measured amplitude of burst signal 103 and a measured amplitude of burst signal 107. For purposes of computing the first value, the respective amplitudes of these burst signals are read by head 21 that when head 21 is moved 25% in a first direction from the center of the track, that is, −25% on a coordinate plane. A second value "Pos" is computed as an absolute value of a difference between a measured amplitude of burst signal 101 and a measured amplitude of burst signal 107. For purposes of computing the second value, the respective amplitudes of these burst signals are read by head 21 that when head 21 is moved 25% in a second direction from the center of the track, that is, +25% on the coordinate plane. The first and second values computed for the odd track can be expressed by the equations "Neg=|B−D|" and "Pos=|A−D|", respectively (S150).

Where the track is an even numbered track, the first absolute value "Neg" is computed as an absolute value of a difference between a measured amplitude of burst signal 101 and a measured amplitude of burst signal 105. Again, for purposes of computing the first value, the respective amplitudes of these burst signals are read by head 21 that when head 21 is moved 25% in a first direction from the center of the track, that is, −25% on a coordinate plane. For the even numbered track, the second value "Pos" is computed as an absolute value of a difference between a measured amplitude of burst signal 103 and a measured amplitude of burst signal 105. And again, for purposes of computing the second value, the respective amplitudes of these burst signals are read by head 21 that when head 21 is moved 25% in a second direction from the center of the track, that is, +25% on the coordinate plane. The first and second values computed for the even track can be expressed by the equations "Neg=|A−C|" and "Pos=|B−C|", respectively (S160).

Figure 11:
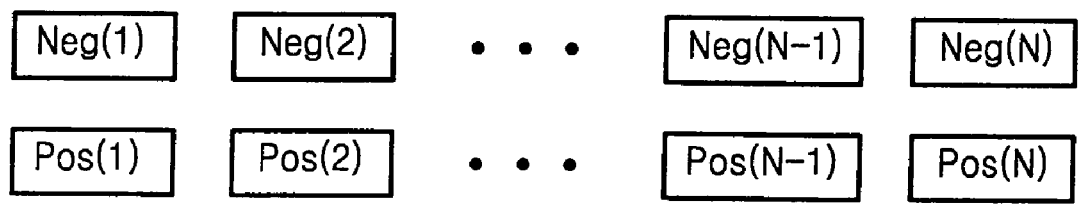
FIG. 11 is a conceptual diagram illustrating an arrangement of data estimation values measured on N numbered tracks subject to a test; and, FIG. 12 is a graph showing an example of variation in a track width as measured in a hard disk drive according to an embodiment of the invention.

First and second values Neg and Pos are calculated for "N" different tracks, where N is a natural number. In FIG. 10A, the index "i" is used to denote a number of a track being measured, where the value of "i" ranges from 1 to N. Accordingly, steps S100, S150 and S160 are repeated "N" times, incrementing the index "i" to compute "N" first and second values. As an example, FIG. 11 shows "N" first and second values measured in relation to N-numbered tracks.

Once the first and second values are computed for "N" tracks of the hard disk drive, the first and second values are normalized using steps described below.

First, a first average "NegAvg" is computed for the "N" first values, and a second average "PosAvg" is computed for the "N" second values (S200). The first and second averages can be computed by the following equations (1) and (2):

$$NegAvg = \frac{\sum_{i=1}^{n} Neg(k)}{N}, \quad PosAvg = \frac{\sum_{i=1}^{n} Pos(k)}{N}. \quad (1), (2)$$

Next, each of the "N" first and second values Neg and Pos are normalized by dividing them by an arithmetic average $$\left(\frac{NegAvg + PosAvg}{2}\right)$$

of the first and second averages. Normalized first values NegTW and normalized second values PosTW are calculated in a step S300 according to the following equations (3) and (4):

$$NegTW(i) = \frac{Neg(i)}{\frac{NegAvg + PosAvg}{2}} \quad (3)$$

$$PosTW(i) = \frac{Pos(i)}{\frac{NegAvg + PosAvg}{2}}. \quad (4)$$

Figure 12:
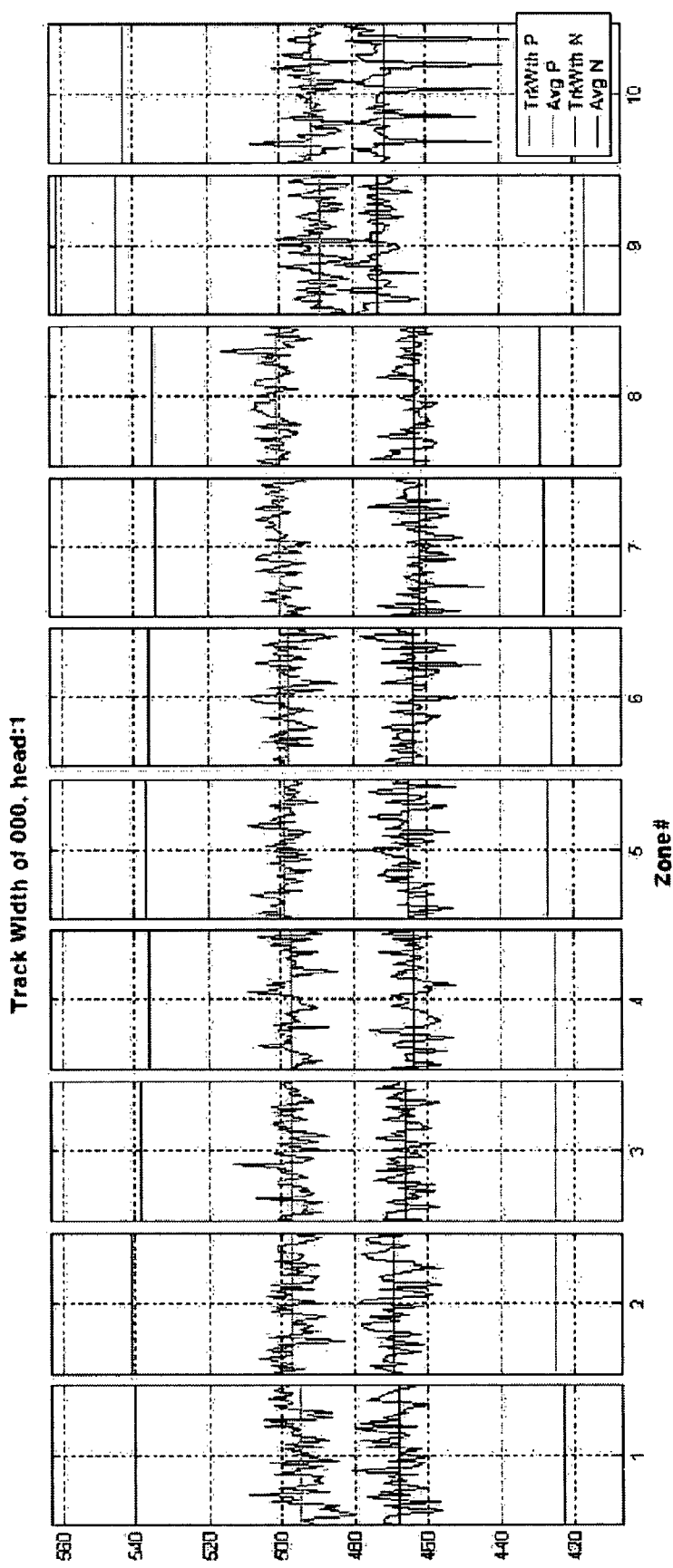

FIG. 12 is a graph showing an example of track width variation in a hard disk drive as measured using the method of FIG. 10.

The graph of FIG. 12 is plotted using the normalized first values NegTW and normalized second values PosTW computed according to equations (3) and (4), respectively. Referring to FIG. 12, the first and second values used as reference values for measurements of the track width are normalized to values having the same scale regardless of the burst amplitude variation in servo sectors or the TPI variation in a hard disk drive. Accordingly, track width variation can be determined in a relatively precise manner by using a same allowable limit value to evaluate the track width variation of hard disk drives having burst signals with different characteristics.

After normalized first and second values NegTW and PosTW are computed in step S300, the normalized first and second values are compared with respective maximum allowable values NegTW_lim and PosTW_lim (S400 and S500). As these comparisons are made, a count CNT is maintained of the number of normalized first and second values that exceed their respective maximum allowable values.

After steps S400 and S500, average values of normalized first and second values are computed as NegTWAvg and PosTWAvg, respectively (S600). These values are computed by the following equations (5) and (6):

$$NegTWAvg = \frac{\sum_{m=1}^{N} NegTW(m)}{N} \quad (5)$$

$$PosTWAvg = \frac{\sum_{m=1}^{N} PosTWavg(m)}{N}. \quad (6)$$

After step S600, the method computes a difference between the average values of the normalized first and second values (S700). If this difference is greater than a predetermined allowable limit C_lim, then the method determines that the tracks of the hard disk drive are too irregular for reliable use (S900). Otherwise, if the difference between the average values of the normalized first and second values is less than the predetermined allowable limit C_lim, then the method compares the value of count CNT to a predetermined maximum limit CNT_lim to determine whether an excessive number of normalized first and second values are larger than their respective maximum allowable values NegTW_lim and PosTW_lim (S800). Where the value of count CNT is larger than maximum limit CNT_lim, the method determines that the tracks of the hard disk drive are too irregular for reliable use (S900). Otherwise, the method determines that the tracks of the hard disk drive are sufficiently regular for reliable use.

In the above method, count CNT can be thought of as a representation of the amount of track width variation within each track, and the difference computed in step S700 can be thought of as a representation of an average alignment of each track or a variation between the widths of different tracks. Accordingly, the method of FIG. 10 can be used to screen hard disk drives for different irregular track characteristics.

A hard disk drive is screened for irregular tracks during a manufacturing process to prevent defective hard drives from being introduced into computer systems. Using the method of FIG. 10, excessive variations in track width can be effectively identified even in situations where a constant allowable limit value is difficult to apply due to burst amplitude variation or TPI variation.

In the above-described method, burst signals 101, 103, 105, and 107 of the servo sector of a track are detected by a head moving at a distance corresponding to ¼ of the track width in each of first and second directions from the center of the track. However, the distance that the head is moved from the center of the track can be changed. For example, burst signals A, B, C, and D in the servo sector of the track could be detected by a head that is moved by 20% of a track width from the center of the track.

As described above, excessive variation in a track width can be detected by using the same allowable limit value regardless of amplitude variation of a burst signal of a servo sector or the variation of TPI. Accordingly, not only defects in a track width can be more accurately and easily identified compared to the conventional technology, but also a potential off-track phenomenon that may be caused by irregularity of the track width due to the inaccurate positioning of a servo writer can be prevented in advance. Accordingly, a hard disk drive manufactured using the above method has increased reliability and quality relative to conventional hard disk drives.

The foregoing exemplary embodiments are teaching examples. Those of ordinary skill in the art will understand that various changes in form and details may be made to the exemplary embodiments without departing from the scope of the invention as defined by the following claims.

What is claimed:

1. A method of measuring track widths in a hard disk drive, the method comprising:
    calculating a plurality of estimation values based on differences in intensity between a plurality first measurement signals produced in relation to a head of the hard disk drive based on a plurality of burst signals stored in servo sectors of a track when the head moves along the track on a first side of a center of the track, and a plurality of second measurement signals produced in relation to the head of the hard disk drive based on the plurality of burst signals when the head moves along the track on a second side of the center of the track opposite the first side;
    normalizing the plurality of estimation values; and,
    detecting excessive variation in the track widths of the hard disk drive based on the normalized estimation values,
    wherein the plurality of burst signals comprises first through fourth burst signals, and the plurality of first and second measurement signals produced in relation to the plurality of burst signals comprises respective first through fourth measurement signals corresponding to the first through fourth burst signals; and
    the calculating of the predetermined estimation values comprises:
        determining whether the track is an odd numbered track or an even numbered track,
        if the track is an odd numbered track, calculating a first value "Neg" as an absolute value of a difference between an intensity of the second measurement signal and an intensity of the fourth measurement signal, as read by the head when moving along the first side of the track, and calculating a second value "Pos" as an absolute value of a difference between an intensity of the first measurement signal and an intensity of the fourth measurement signal, as read by the head when moving along the second side of the track; and
        if the track is an even numbered track, calculating the first value "Neg" as an absolute value of a difference between an intensity of the first measurement signal and an intensity of the third measurement signal, as read by the head when moving along the first side of the track, and calculating the second value "Pos" as an absolute value of a difference between an intensity of the second measurement signal and an intensity of the third measurement signal, as read by the head when moving along the second side of the track,
    the first and second values being included within the plurality of estimation values.

2. The method of claim 1, wherein normalizing the estimation values comprises computing "N" first values and "N" second values in relation to the track;
    computing an average NegAvg of the first values, and computing an average PosAvg of the second values; and,
    computing "N" normalized first values NegTW by dividing each of the "N" first values by a normalization factor defined as $$\left(\frac{NegAvg + PosAvg}{2}\right),$$

and computing "N" normalized second values PosTW by dividing each of the "N" second values by the normalization factor.

3. The method of claim 2, further comprising:
    computing a sum of the number of normalized first values NegTW that are greater than an allowable maximum value NegTW_lim and the number of the normalized second values PosTW that are greater than an allowable maximum value PosTW;
    determining track width variation in the hard disk drive to be excessive when the sum is greater than a maximum value CNT_lim.

4. The method of claim 2, wherein normalizing the predetermined estimation values further comprises:
    calculating a first average value NegTWAvg of the "N" normalized first values NegTW and a second average value PosTWAvg of the "N" normalized second values PosTW.

5. The method of claim 4, further comprising:
    computing a difference between the second average value and the first average value; and,
    determining track width variation in the hard disk drive to be excessive when the difference between the second average value and the first average value is greater than a maximum value C_lim.

6. The method of claim 1, wherein the head moves along the first and second sides of the track at a predetermined distance from the center of the track equal to about ¼ of the total width of the track.

7. A data storage medium storing a computer program for performing a method comprising:
calculating a plurality of estimation values based on differences in intensity between a plurality first measurement signals produced in relation to a head of the hard disk drive based on a plurality of burst signals stored in servo sectors of a track when the head moves along the track on a first side of a center of the track, and a plurality of second measurement signals produced in relation to the head of the hard disk drive based on the plurality of burst signals when the head moves along the track on a second side of the center of the track opposite the first side;
normalizing the plurality of estimation values; and,
detecting excessive variation in the track widths of the hard disk drive based on the normalized estimation values,
wherein the plurality of burst signals comprises the first through fourth burst signals, and the plurality of the first and second measurement signals produced in relation to the plurality of burst signals comprises respective first through fourth measurement signals corresponding to the first through fourth burst signals; and
the calculating of the predetermined estimation values comprises:
determining whether the track is an odd numbered track or an even numbered track,
if the track is an odd numbered track, calculating a first value "Neg" as an absolute value of a difference between an intensity of the second measurement signal and an intensity of the fourth measurement signal, as read by the head when moving along the first side of the track, and calculating a second value "Pos" as an absolute value of a difference between an intensity of the first measurement signal and an intensity of the fourth measurement signal, as read by the head when moving along the second side of the track; and
if the track is an even numbered track, calculating the first value "Neg" as an absolute value of a difference between an intensity of the first measurement signal and an intensity of the third measurement signal, as read by the head when moving along the first side of the track, and calculating the second value "Pos" as an absolute value of a difference between an intensity of the second measurement signal and an intensity of the third measurement signal, as read by the head when moving along the second side of the track,
the first and second values being included within the plurality of estimation values.

8. The method of claim 7, wherein the head moves along the first and second sides of the track at a predetermined distance from the center of the track equal to about ¼ of the total width of the track.

9. A hard disk drive comprising:
a storage medium comprising tracks adapted to record and store information;
a head adapted to read data from the disk; and,
a controller adapted to calculate a plurality of estimation values based on differences in intensity between a plurality first measurement signals produced in relation to the head based on a plurality of burst signals stored in servo sectors of a track of the storage medium when the head moves along the track on a first side of a center of the track, and a plurality of second measurement signals produced in relation to the head of the hard disk drive based on the plurality of burst signals when the head moves along the track on a second side of the center of the track opposite the first side,
wherein the controller normalizes the plurality of estimation values and detects excessive variation in the track widths of the hard disk drive based on the normalized estimation values,
the plurality of burst signals comprises first through fourth burst signals, and the plurality of first and second measurement signals produced in relation to the plurality of burst signals comprises respective first through fourth measurement signals corresponding to the first through fourth burst signals;
the controller computes the estimation values by determining whether the track is an odd numbered track or an even numbered track;
where the track is an odd numbered track, the controller calculates a first value "Neg" as an absolute value of a difference between an intensity of the second measurement signal and an intensity of the fourth measurement signal, as read by the head when moving along the first side of the track, and calculates a second value "Pos" as an absolute value of a difference between an intensity of the second measurement signal and an intensity of the third measurement signal, as read by the head when moving along the second side of the track; and
where the track is an even numbered track, the controller calculates the first value "Neg" as an absolute value of a difference between an intensity of the first measurement signal and an intensity of the third measurement signal, as read by the head when moving along the first side of the track, and calculates the second value "Pos" as an absolute value of a difference between an intensity of the second measurement signal and an intensity of the third measurement signal, as read by the head when moving along the second side of the track,
the first and second values being included within the plurality of estimation values.

10. The hard disk drive of claim 9, wherein the controller normalizes the estimation values by computing "N" first values and "N" second values in relation to the track, computing an average NegAvg of the first values, computing an average PosAvg of the second values, and computing "N" normalized first values NegTW by dividing each of the "N" first values by a normalization factor defined as $$\left(\frac{NegAvg + PosAvg}{2}\right),$$

and computing "N" normalized second values PosTW by dividing each of the "N" second values by the normalization factor.

11. The hard disk drive of claim 10, wherein the controller computes a sum of the number of normalized first values NegTW that are greater than an allowable maximum value NegTW_lim and the number of the normalized second values PosTW that are greater than an allowable maximum value PosTW and determines track width variation in the hard disk drive to be excessive when the sum is greater than a maximum value CNT_lim.

12. The hard disk drive of claim 10, wherein the controller normalizes the estimation values by calculating a first average value NegTWAvg of the "N" normalized first values NegTW and a second average value PosTWAvg of the "N" normalized second values PosTW.

13. The hard disk drive of claim 12, wherein the controller computes a difference between the second average value and the first average value, and determines track width variation in the hard disk drive to be excessive when the difference between the second average value and the first average value is greater than a maximum value C_lim.

* * * * *